US012623727B2

(12) United States Patent　　(10) Patent No.:　US 12,623,727 B2
Sasaki et al.　　　　　　　　　　(45) Date of Patent: 　　 May 12, 2026

(54) FLOOR STRUCTURE FOR VEHICLE

(71) Applicant: Honda Motor Co., Ltd., Tokyo (JP)

(72) Inventors: Takuya Sasaki, Tokyo (JP); Yuki Muramatsu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 18/533,132

(22) Filed: Dec. 7, 2023

(65) Prior Publication Data

US 2024/0246616 A1　　Jul. 25, 2024

(30) Foreign Application Priority Data

Jan. 19, 2023　(CN) .......................... 202310056212.0

(51) Int. Cl.
*B62D 25/20*　　　　(2006.01)
(52) U.S. Cl.
CPC ................................ *B62D 25/2036* (2013.01)
(58) Field of Classification Search
CPC . B62D 25/20; B62D 25/2009; B62D 25/2036
USPC ........................................ 296/187.08, 193.07
See application file for complete search history.

(56) References Cited

U.S. PATENT DOCUMENTS

| | | | | |
|---|---|---|---|---|
| 7,637,561 B2 * | 12/2009 | Egawa | ............... | B62D 25/2072 |
| | | | | 296/193.07 |
| 8,939,498 B2 * | 1/2015 | Fisk | ....................... | B62D 43/10 |
| | | | | 296/193.07 |
| 2023/0312016 A1 * | 10/2023 | Muramatsu | ............ | B62D 25/20 |
| | | | | 296/193.07 |

FOREIGN PATENT DOCUMENTS

| | | | | | |
|---|---|---|---|---|---|
| JP | 2017144946 A | * | 8/2017 | ............. | B62D 25/20 |
| JP | 2017144955 | | 8/2017 | | |

* cited by examiner

*Primary Examiner* — Jason S Daniels
(74) *Attorney, Agent, or Firm* — JCIPRNET

(57) ABSTRACT

A floor structure for a vehicle is capable of suppressing vibration of a floor panel with a simple structure. The floor structure for the vehicle includes: side sills, which are disposed on opposite outer sides of the vehicle in a vehicle width direction; a floor tunnel, which is disposed on an inner side in the vehicle width direction in parallel with the side sills; and a floor panel, which is disposed between the side sill and the floor tunnel, and includes a floor frame extending along a vehicle front-rear direction and multiple transverse beads extending along the vehicle width direction. At least a part of the transverse beads extends to a position overlapping with the floor frame and intersects with the floor frame.

9 Claims, 3 Drawing Sheets

FLOOR STRUCTURE FOR VEHICLE

CROSS-REFERENCE TO RELATED APPLICATION

This application claims the priority benefit of China application serial no. 202310056212.0, filed on Jan. 19, 2023. The entirety of the above-mentioned patent application is hereby incorporated by reference herein and made a part of this specification.

BACKGROUND

Technical Field

The disclosure relates to a floor structure for a vehicle.

Description of Related Art

In recent years, the importance of improving the safety of transportation systems has increased, taking into account vulnerable groups such as the elderly and children among transportation participants. In order to achieve this goal, efforts must be made to improve development related to the improvement of vehicle rigidity to further improve transportation safety and convenience. In the related art (Japanese Patent Application Laid-Open No. 2017-144955), in order to achieve space utilization efficiency and weight reduction, the cross-sectional width of the floor cross member is set to be relatively narrow. However, such a design causes the rigidity of the floor panel to decrease, thereby intensifying the vibration of the floor panel. The disclosure is capable of suppressing the vibration of the floor panel with a simple structure, thereby contributing to the development of a sustainable transport system.

SUMMARY

The disclosure provides a floor structure for a vehicle capable of suppressing vibration of a floor panel with a simple structure.

The floor structure for the vehicle of the disclosure includes: side sills, which are disposed on opposite outer sides of the vehicle in a vehicle width direction; a floor tunnel, which is disposed on an inner side in the vehicle width direction in parallel with the side sills; and a floor panel, which is disposed between the side sill and the floor tunnel, and includes a floor frame extending along a vehicle front-rear direction and multiple transverse beads extending along the vehicle width direction. At least a part of the transverse beads extends to a position overlapping with the floor frame and intersects with the floor frame.

In an embodiment of the disclosure, the floor frame includes: a side wall, which extends upward from the floor panel in a vehicle up-down direction, and includes a flange section joined to the floor panel; and an upper wall, which is connected to the side wall. The transverse beads extend across the side wall when viewed from the vehicle up-down direction.

In an embodiment of the disclosure, the floor panel further includes a flat section, which is disposed between the transverse beads, and the flange section of the floor frame is joined to the flat section.

In an embodiment of the disclosure, a curved section is disposed between a joint of the flange section and the flat section, the curved section protrudes along one side in the vehicle up-down direction, and the curved section is disposed separately from the transverse beads.

In an embodiment of the disclosure, the floor panel further includes a longitudinal bead, which corresponds to the floor frame and extends along the vehicle front-rear direction when viewed from the vehicle up-down direction. The transverse beads extend to the longitudinal bead.

In an embodiment of the disclosure, the transverse beads include: a first bead section, which protrudes toward one side in the vehicle up-down direction; and second bead sections, which are formed at opposite ends of the first bead section in the vehicle front-rear direction and protrude toward the other side in the vehicle up-down direction.

In an embodiment of the disclosure, a portion of the transverse beads located on a rear side in the vehicle front-rear direction is disposed separately from the floor frame.

In an embodiment of the disclosure, the floor panel further includes: a floor cross member, which is disposed on an upper surface of the floor panel and connected to the floor tunnel and the side sill; and seat brackets, which are disposed to be connected to end sections of the floor cross member in the vehicle width direction in the vehicle front-rear direction. The transverse beads are disposed behind the floor cross member in the vehicle front-rear direction.

In an embodiment of the disclosure, the floor frame includes: a first floor frame, which is disposed at a side close to the side sill; and a second floor frame, which is disposed at a side close to the floor tunnel. The transverse beads are formed between the first floor frame and the second floor frame, and the transverse beads overlap with the first floor frame.

Based on the above, in the floor structure for the vehicle of the disclosure, the floor panel includes the floor frame and the transverse beads that overlap and intersect with the floor frame. Therefore, through a design in which the floor frame which increases the rigidity in the vehicle front-rear direction overlaps and intersects with the transverse beads which increase the rigidity in the vehicle width direction, the rigidity of the entire floor panel can be increased, thereby suppressing the vibration of the floor panel. Accordingly, the floor structure for the vehicle of the disclosure is capable of suppressing the vibration of the floor panel with a simple structure.

DESCRIPTION OF THE EMBODIMENTS

Figure 1:
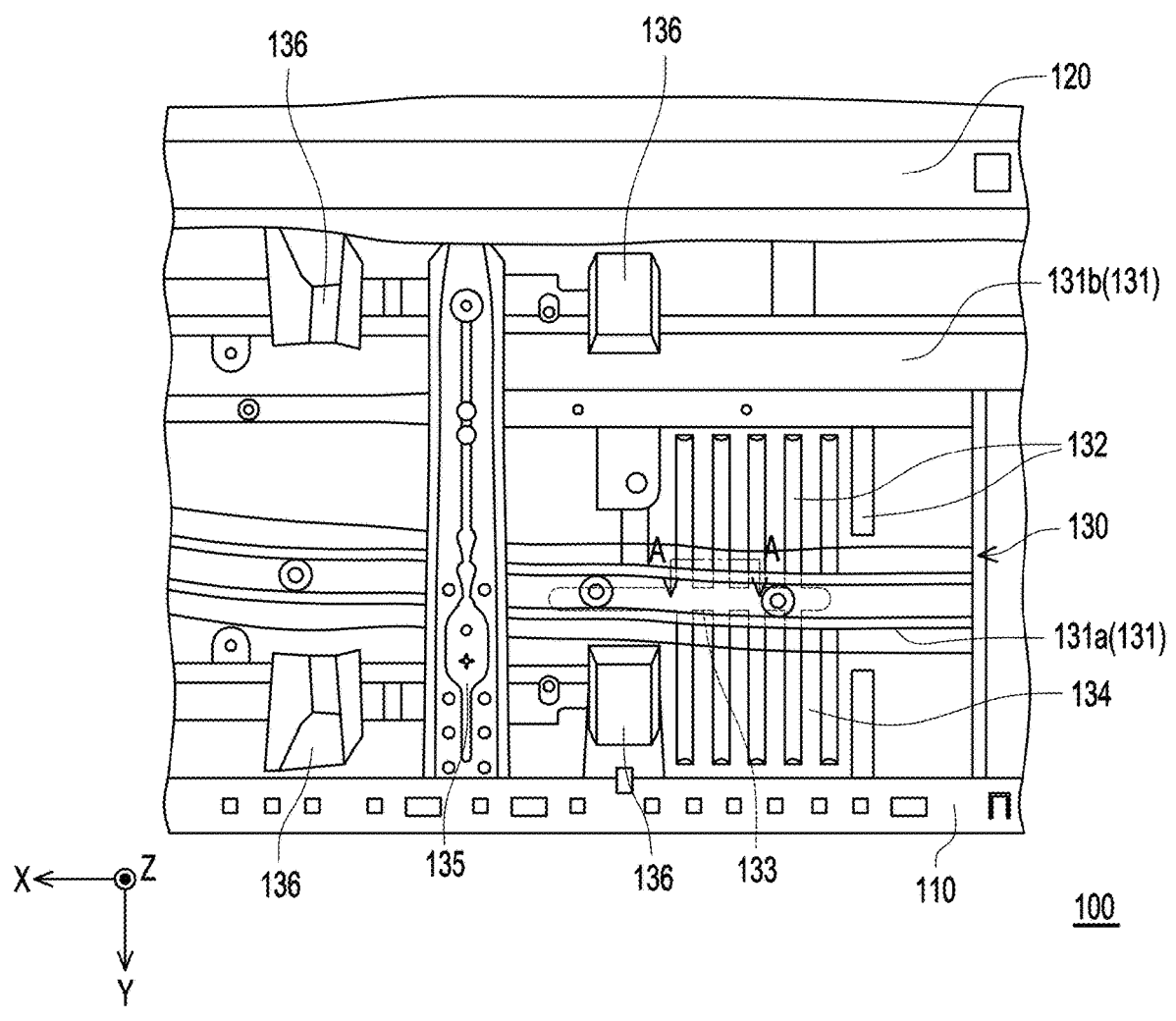
FIG. 1 is a schematic top view of a floor structure for a vehicle according to an embodiment of the disclosure.
Figure 2:
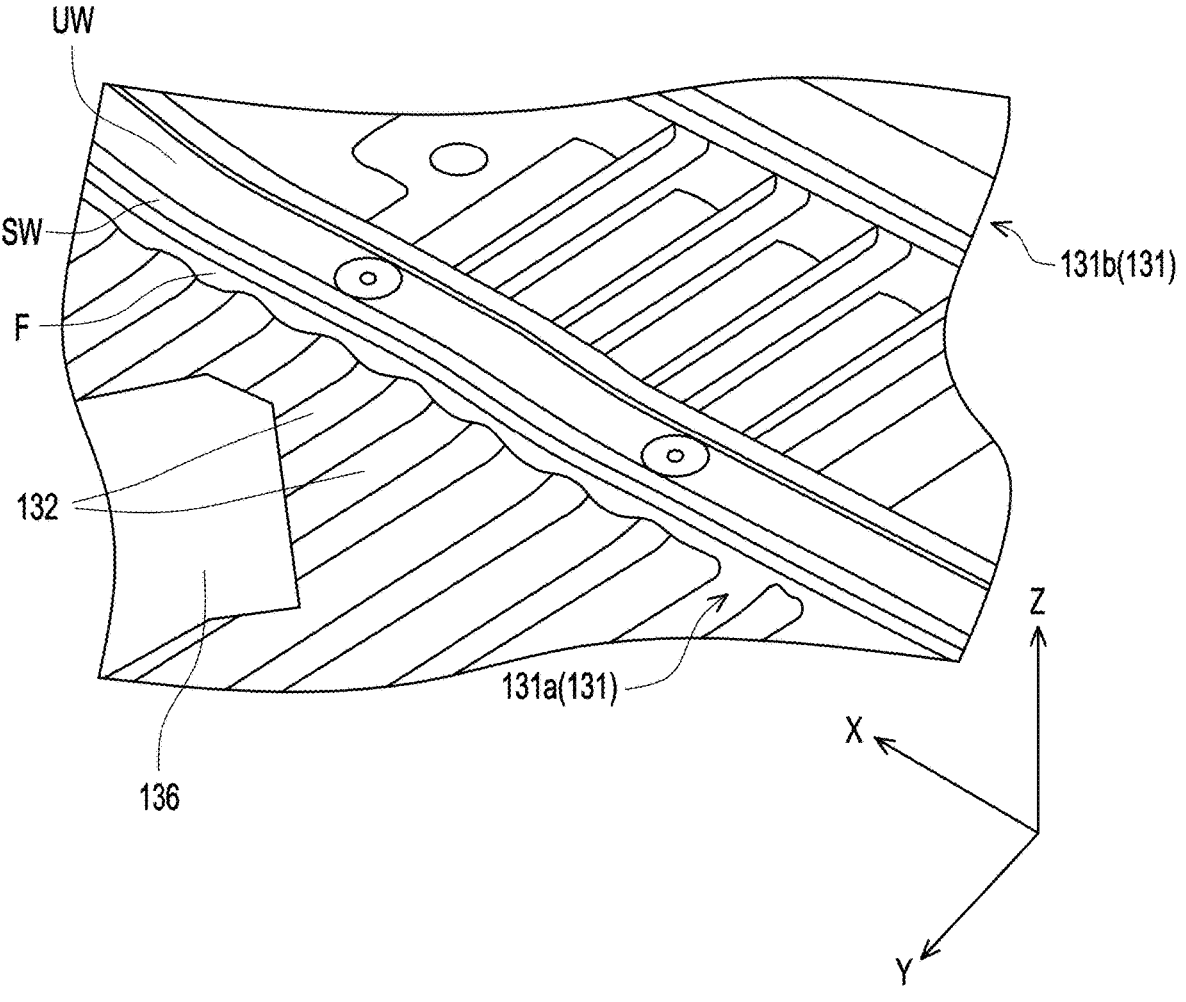
FIG. 2 is a partial perspective view of the floor structure for the vehicle of FIG. 1.
Figure 3:
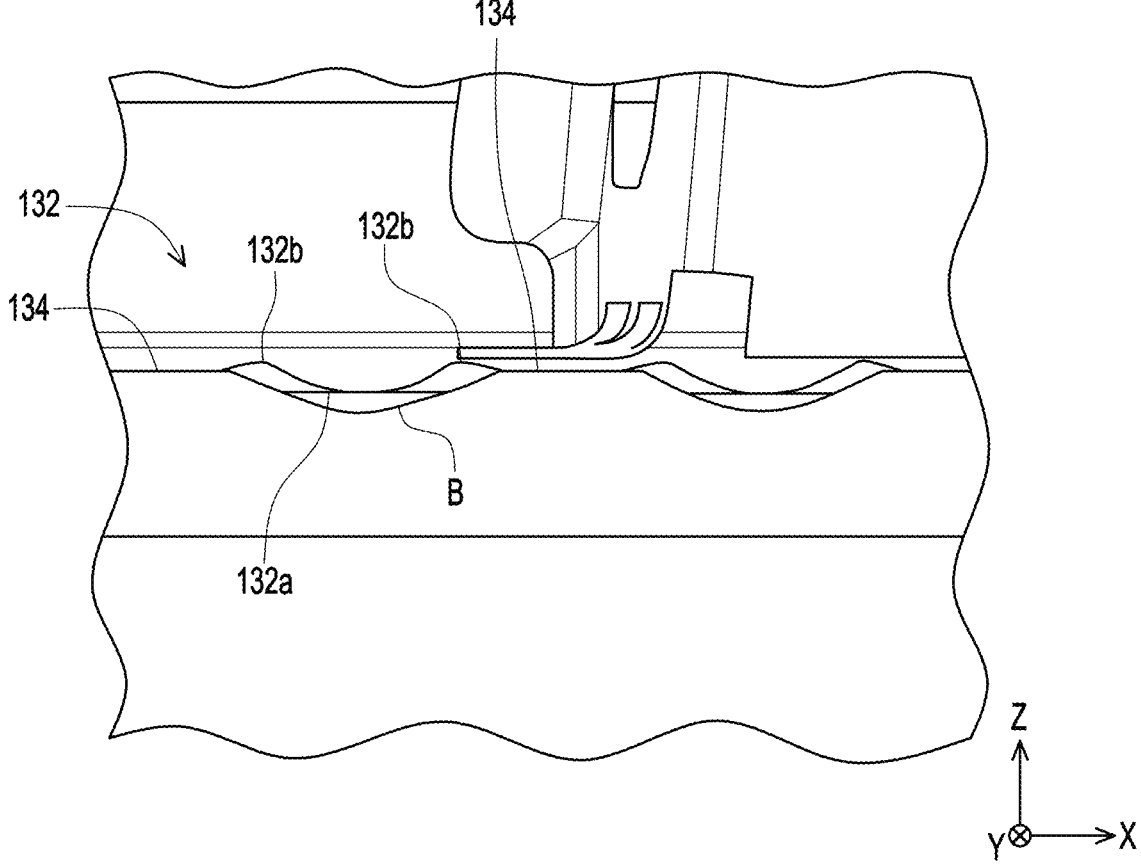
FIG. 3 is a cross-sectional view of the floor structure for the vehicle of FIG. 1 along an A-A section line.

FIG. 1 is a schematic top view of a floor structure for a vehicle according to an embodiment of the disclosure. FIG. 2 is a partial perspective view of the floor structure for the vehicle of FIG. 1. FIG. 3 is a cross-sectional view of the floor structure for the vehicle of FIG. 1 along an A-A section line. In the embodiment, a floor structure for a vehicle 100 is, for example, a floor structure applied in an ordinary passenger car (not shown), but the disclosure is not limited thereto. Since the floor structure for the vehicle 100 is a substantially symmetrical structure, the drawings merely show partial schematic diagrams to simplify the description, and a vehicle front-rear direction X, a vehicle width direction Y, and a vehicle up-down direction Z in the drawings are not intended to limit the positional relationship of each of components of the disclosure. In addition, it should be noted that, unless otherwise stated, the front, outer side, and above used in the following description are the directions pointed by arrows of the vehicle front-rear direction X, the vehicle width direction Y, and the vehicle up-down direction Z. The rear, inner side, and below used in the description are the opposite directions of the aforementioned. Reference is now made in detail to exemplary embodiments of the disclosure, and examples of the exemplary embodiments are illustrated in the accompanying drawings. Wherever possible, the same reference numerals are used in the accompanying drawings and descriptions to refer to the same or similar parts.

Referring to FIG. 1, in the embodiment, a floor structure for a vehicle 100 includes side sills 110, a floor tunnel 120 and a floor panel 130. The side sills 110 are disposed on opposite outer sides of the vehicle in the vehicle width direction Y (merely one side is illustrated in the drawing), and extend along the vehicle front-rear direction X. The floor tunnel 120 is disposed on an inner side in the vehicle width direction Y in parallel with the side sills 110. More specifically, the floor tunnel 120 is approximately disposed at a central position in the vehicle width direction Y between the side sills 110 on opposite sides. The floor panel 130 is disposed between the side sill 110 and the floor tunnel 120. The floor panel 130 includes a floor frame 131 extending along the vehicle front-rear direction X and multiple transverse beads 132 extending along the vehicle width direction Y. That is to say, the floor frame 131 and the transverse beads 132 extend orthogonally to each other. At least a part of the transverse beads 132 (for example, a portion located on the front side in the vehicle front-rear direction X, but not limited thereto) extends to a position overlapping with the floor frame 131 and intersects with the floor frame 131.

It can be seen from this that in the floor structure for the vehicle 100 of the embodiment, the floor panel 130 includes the floor frame 131 and the transverse beads 132 that overlap and intersect with the floor frame 131. Therefore, through a design in which the floor frame 131 which increases the rigidity in the vehicle front-rear direction X overlaps and intersects with the transverse beads 132 which increase the rigidity in the vehicle width direction Y, the rigidity of the entire floor panel 130 can be increased, thereby suppressing the vibration of the floor panel 130. Accordingly, the floor structure for the vehicle 100 of the disclosure is capable of suppressing the vibration of the floor panel 130 with a simple structure.

In addition, in the embodiment of the disclosure, a portion of the transverse beads 132 located on a rear side in the vehicle front-rear direction X is disposed separately from the floor frame 131. Moreover, a part of the floor panel 130 provided with the transverse beads 132 is a front panel section, and a part of the floor panel 130 at the rear side of the front panel section in the vehicle front-rear direction X is a rear panel section (the part not provided with the transverse beads 132), but the disclosure is not limited thereto. Therefore, the length of the back side of the floor panel 130 can be adjusted and manufactured according to different vehicle types, which has better versatility. In addition, in an exemplary example, the floor panel 130 further includes a longitudinal bead 133. The longitudinal bead 133 corresponds to the floor frame 131 and extends along the vehicle front-rear direction X when viewed from the vehicle up-down direction Z. The transverse beads 132 extend to the longitudinal bead 133 and intersect with the longitudinal bead 133. In this way, when a coating process such as electrodeposition coating is performed, the coating liquid remaining in the transverse beads 132 can be discharged through the longitudinal bead 133.

Referring to FIGS. 1 and 2, in the embodiment, the floor frame 131 includes a side wall SW and an upper wall UW (as shown in FIG. 2). The side wall SW extends upward from the floor panel 130 in the vehicle up-down direction Z, and the upper wall UW is connected to an upper side of the side wall SW along the vehicle width direction Y. In other words, the cross section of the floor frame 131 is formed in a cover shape with an opening facing downward. The side wall SW includes a flange section F that is joined to the floor panel 130. The transverse beads 132 extend across the side wall SW when viewed from the vehicle up-down direction Z. Therefore, the vibration of the floor panel 130 can be suppressed. In an exemplary example, the floor frame 131 includes a first floor frame 131*a* and a second floor frame 131*b*. The first floor frame 131*a* is disposed at a side close to the side sill 110, and the second floor frame 131*b* is disposed at a side close to the floor tunnel 120. The transverse beads 132 are formed between the first floor frame 131*a* and the second floor frame 132*b*, and the transverse beads 132 overlap with the first floor frame 131*a*. Therefore, even away from the floor tunnel 120 with relatively high rigidity, the rigidity can be improved by the transverse beads 132 between the second floor frame 131*b* and the first floor frame 131*a*, thereby suppressing vibration.

Referring to FIG. 3, in the embodiment, the floor panel 130 further includes a flat section 134. The flat section 134 is disposed between the transverse beads 132. The flange section F of the floor frame 131 is joined to the flat section 134 to ensure that the floor frame 131 can be firmly joined. Furthermore, the floor frame 131 and the transverse beads 132 together improve the rigidity of the floor panel 130 to suppress vibration. In addition, a curved section B is disposed between a joint of the flange section F and the flat section 134. The curved section B protrudes along one side in the vehicle up-down direction Z (in the example, the lower side in the vehicle up-down direction Z, but is not limited thereto), and is disposed separately from the transverse beads 132. Such a disposition method may ensure that a space exits between the transverse beads 132 and the floor frame 131, so that the transverse beads 132 can extend to a position intersecting with the floor frame 131.

Furthermore, in the embodiment, the transverse beads 132 include a first bead section 132*a* and second bead sections 132*b*. The first bead section 132*a* protrudes toward one side in the vehicle up-down direction Z (in the example, the lower side in the vehicle up-down direction Z, but is not limited thereto). The second bead sections 132*b* are formed at opposite ends of the first bead section 132*a* in the vehicle front-rear direction X. However, the disclosure is not limited thereto, as long as the second bead sections 132*b* are formed perpendicular to an extending direction of the transverse beads 132. The second bead sections 132*b* protrude toward the other side in the vehicle up-down direction Z (in the example, the upper side in the vehicle up-down direction Z, but is not limited thereto). By being disposed to protrude in both the up and down directions in the vehicle front-rear direction X, the transverse beads 132 can further suppress vibration transmitted from the vehicle width direction Y.

Referring to FIG. 1 again, in the embodiment, the floor panel 130 further includes a floor cross member 135 and seat brackets 136. The floor cross member 135 is disposed on an upper surface of the floor panel 130 and is connected to the floor tunnel 120 and the side sill 110. The seat brackets 136 are disposed to be connected to end sections of the floor cross member 135 in the vehicle width direction Y in the vehicle front-rear direction X. The transverse beads 132 are disposed behind the floor cross member 135 in the vehicle front-rear direction X. Accordingly, the floor cross member 135 of the embodiment can maintain a relatively large cross-section, and have enough space to be provided with the transverse beads 132 to improve the overall rigidity of the floor panel 130. Therefore, the floor structure for the vehicle 100 of the embodiment can transmit the load during a side impact and suppress floor vibration.

In summary, in the floor structure for the vehicle of the disclosure, the floor panel includes the floor frame and the transverse beads that overlap and intersect with the floor frame. Therefore, through a design in which the floor frame which increases the rigidity in the vehicle front-rear direction overlaps and intersects with the transverse beads which increase the rigidity in the vehicle width direction, the rigidity of the entire floor panel can be increased, thereby suppressing the vibration of the floor panel. In an exemplary example, the floor frame includes a first floor frame at a side close to the side sill and a second floor frame at a side close to the floor tunnel. The transverse beads are formed between the first floor frame and the second floor frame and overlap with the first floor frame. Therefore, even away from the floor tunnel with relatively high rigidity, the rigidity can be improved by the transverse beads between the second floor frame and the first floor frame, thereby suppressing vibration. Accordingly, the floor structure for the vehicle of the disclosure is capable of suppressing the vibration of the floor panel with a simple structure.

Finally, it should be noted that the above embodiments are only used to illustrate the technical solutions of the disclosure, but not to limit the technical solutions of the disclosure. Although the disclosure has been described in detail with reference to the foregoing embodiments, those of ordinary skill in the art should understand that the technical solutions described in the foregoing embodiments may still be modified, or some or all of the technical features thereof may be equivalently replaced. However, these modifications or substitutions do not make the essence of the corresponding technical solutions deviate from the scope of the technical solutions of the embodiments of the disclosure.

What is claimed is:

1. A floor structure for a vehicle, comprising:
side sills, disposed on opposite outer sides of the vehicle in a vehicle width direction;
a floor tunnel, disposed on an inner side in the vehicle width direction in parallel with the side sills; and
a floor panel, disposed between the side sill and the floor tunnel, and comprising a floor frame extending along a vehicle front-rear direction and a plurality of transverse beads extending along the vehicle width direction, wherein
at least a part of the plurality of transverse beads extends to a position overlapping with the floor frame and intersects with the floor frame.

2. The floor structure for the vehicle according to claim 1, wherein
the floor frame comprises:
a side wall, extending upward from the floor panel in a vehicle up-down direction, and the side wall comprises a flange section joined to the floor panel; and an upper wall, connected to the side wall, wherein
the plurality of transverse beads extend across the side wall when viewed from the vehicle up-down direction.

3. The floor structure for the vehicle according to claim 2, wherein
the floor panel further comprises a flat section, the flat section is disposed between the plurality of transverse beads, and
the flange section of the floor frame is joined to the flat section.

4. The floor structure for the vehicle according to claim 3, wherein
a curved section is disposed between a joint of the flange section and the flat section, and protrudes along one side in the vehicle up-down direction, and
the curved section is disposed separately from the plurality of transverse beads.

5. The floor structure for the vehicle according to claim 1, wherein
the floor panel further comprises a longitudinal bead, the longitudinal bead corresponds to the floor frame when viewed from the vehicle up-down direction, and
the plurality of transverse beads extend to the longitudinal bead.

6. The floor structure for the vehicle according to claim 1, wherein
the plurality of transverse beads comprise:
a first bead section, protruding toward one side in the vehicle up-down direction, and
second bead sections, formed at opposite ends of the first bead section in the vehicle front-rear direction, and protruding toward the other side in the vehicle up-down direction.

7. The floor structure for the vehicle according to claim 1, wherein
a portion of the plurality of transverse beads located on a rear side in the vehicle front-rear direction is disposed separately from the floor frame.

8. The floor structure for the vehicle according to claim 1, wherein
the floor panel further comprises:
a floor cross member, disposed on an upper surface of the floor panel and connected to the floor tunnel and the side sill, and
seat brackets, disposed to be connected to end sections of the floor cross member in the vehicle width direction in the vehicle front-rear direction, wherein
the plurality of transverse beads are disposed behind the floor cross member in the vehicle front-rear direction.

9. The floor structure for the vehicle according to claim 1, wherein the floor frame comprises:
a first floor frame, disposed at a side close to the side sill, and
a second floor frame, disposed at a side close to the floor tunnel, wherein
the plurality of transverse beads are formed between the first floor frame and the second floor frame, and the plurality of transverse beads overlap with the first floor frame.

\* \* \* \* \*